J. A. BOWDEN.
TIRE.
APPLICATION FILED FEB. 7, 1908.

978,549.

Patented Dec. 13, 1910.
2 SHEETS—SHEET 1.

Witnesses

Inventor
Junius A. Bowden

J. A. BOWDEN.
TIRE.
APPLICATION FILED FEB. 7, 1908.
978,549.
Patented Dec. 13, 1910.
2 SHEETS—SHEET 2.
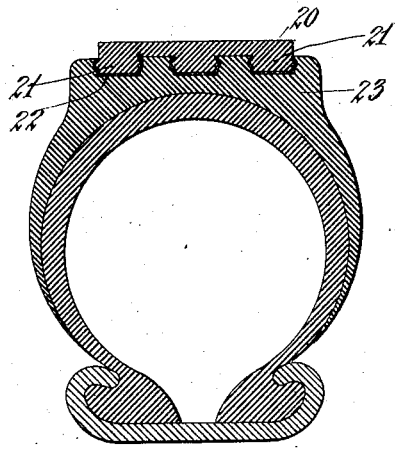
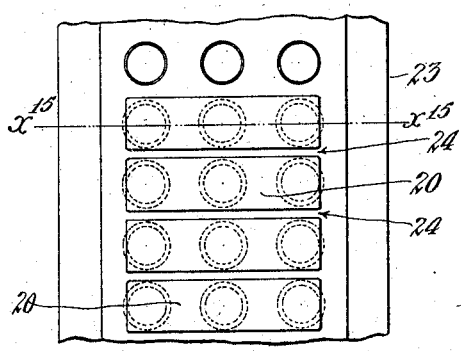
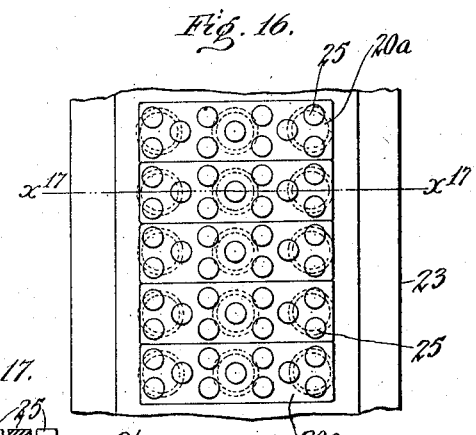
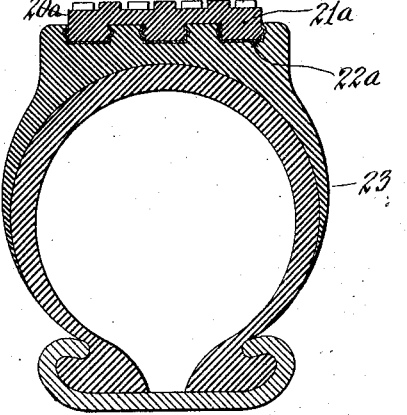
Witnesses:-
Inventor
Junius A. Bowden

UNITED STATES PATENT OFFICE.

JUNIUS A. BOWDEN, OF LOS ANGELES, CALIFORNIA.

TIRE.

978,549.   Specification of Letters Patent.   Patented Dec. 13, 1910.

Application filed February 7, 1908. Serial No. 414,827.

*To all whom it may concern:*

Be it known that I, JUNIUS A. BOWDEN, a citizen of the United States, residing at Los Angeles, in the county of Los Angeles and State of California, have invented a new and useful Tire, of which the following is a specification.

This invention relates to tires either solid or pneumatic, and particularly to the tread portion thereof, and the object of the invention is to provide a tire having projections or studs detachably secured in the tread portion so that they may be readily detached when worn and renewed by inserting fresh projections.

The projections increase the tractive qualities of the tire, prevent skidding and minimize punctures, in addition to greatly prolonging the life of the tire by reason of their being readily renewed by any person, no tools or special skill being required for renewing them. The projections also promote the elastic qualities of the tires as the projections are themselves preferably formed of an elastic substance.

The accompanying drawings illustrate several forms of the invention, and referring thereto:—Figure 1 is a sectional view through a solid tire and portion of the rim to which it is attached, the view being taken on line $x^1$—$x^1$ Fig. 2. Fig. 2 is a plan view of a portion of a solid tire constructed in accordance with my invention. Fig. 3 is a sectional view showing a pneumatic tire as constructed with my invention, the body of the tire being of a homogeneous structure. Fig. 4 is a view similar to Fig. 3, showing the body of the tire formed of a plurality of layers, the outermost layer being vulcanized or otherwise secured to the tire, and being provided with the studs or projections. Fig. 5 is a sectional view of the outer layer removed from the body of the tire. Fig. 6 is a sectional view showing a modified form of stud and its engaging means. Fig. 7 is a view similar to Fig. 6, showing another form of stud and its engaging means. Fig. 8 is a view similar to Fig. 6, showing another form of stud and its engaging means. Fig. 9 is a detail view showing still another form of stud. Fig. 10 is a sectional view showing a tread portion provided with the studs, which tread portion is constructed with a plurality of layers which are adapted to be vulcanized or otherwise secured to the body of the tire. Fig. 11 is a sectional view showing another form of engaging means, the stud being shown removed therefrom. Fig. 12 is a view similar to Fig. 11, showing still another form of engaging means and stud, the stud being shown removed therefrom. Fig. 13 is a sectional view in detail of a receptacle. Fig. 14 is a plan view of a portion of a tire, showing another form of projection. Fig. 15 is an enlarged sectional view on line $x^{15}$—$x^{15}$ Fig. 14. Fig. 16 is a view similar to Fig. 14, showing a slight modification thereof. Fig. 17 is an enlarged sectional view on line $x^{17}$—$x^{17}$ Fig. 16.

In the form shown in Fig. 1, 1 designates a solid tire, the tread portion of which is provided with a series of pockets 2, each pocket having an annular groove 3. Projections or studs 4, shown in Fig. 2, are inserted in the pockets 2, each stud projecting into the tire 1 and projecting above the face thereof and being detachably held in place, the stud having an annular rib 5 which is received in the annular groove 3. The studs 4 may preferably be formed of an elastic material, such as rubber.

In Fig. 3 the pockets 2 are provided with a receptacle or lining which is preferably metallic and which conforms to the shape of the pockets, which lining is preferably vulcanized or otherwise permanently secured in the tread portion of the tire. In this figure the tire is shown as a pneumatic tire 7. The linings 6 receive the studs 4 and hold them firmly in place, yet permit the studs to be readily removed therefrom when desired for renewal. The linings 6 also strengthen and reinforce the tire and also minimize puncture as their metallic substance prevents the entrance of tacks or other sharp things which may come in contact with them.

In operation, when a stud is under compression, its portion within the lining is caused to swell and more firmly grip in its seat than if the linings were not employed, because the material of the tire would yield as the stud swelled, but by employing the linings, they do not yield and thus the stud when compressed firmly grips in its seat.

In Fig. 3 the body of the tire 7 is constructed of one mass of rubber throughout.

In Fig. 4 the body of the tire consists of three layers, an outer layer 8, an intermediate layer 9, and an inner layer 10, the outer layer 8 holding the studs 4.

Figure 8:
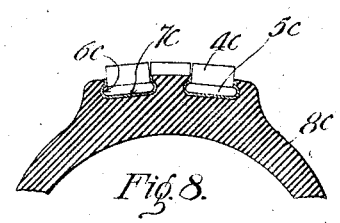
Figure 5:
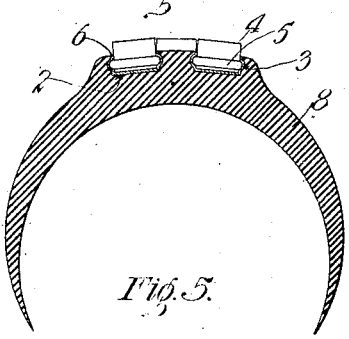
Fig. 5 shows the outer layer 8 with its studs, before the layer has been vulcanized or otherwise secured in place.

In the form shown in Fig. 8, the studs 4ᶜ have an annular flange 5ᶜ for their lower ends which is received in an annular groove 6ᶜ formed in the lining 7ᶜ, and the tire 8ᶜ is shaped to conform to the contour of the linings, the latter being vulcanized or otherwise secured to the tire.

Figure 6:
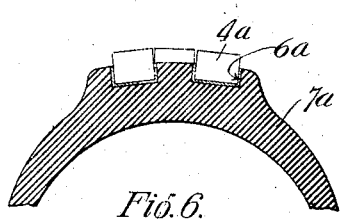
Fig. 6 shows another form in which the linings 6ª are purely cylindrical, the studs 4ª conforming thereto and being held therein by their friction. In this form the linings 6ª are vulcanized or otherwise permanently secured to the tire 7ª.
Figure 4:
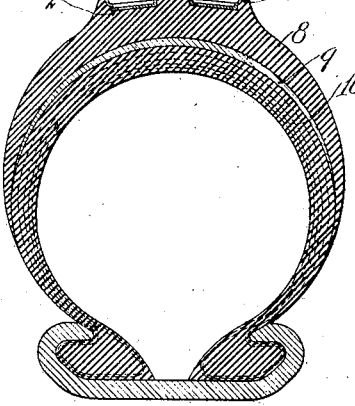
Figure 9:
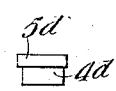

Fig. 9 shows a stud 4ᵈ, in detail, the upper end of which is provided with a flange 5ᵈ. This stud when shaped as shown will fit the forms shown in Figs. 6 or 11.

The flange 5ᵈ seals the joint between the receptacle and tire and prevents the entrance of foreign matter. The flange also enlarges the seat for the stud without necessitating too large a cavity in the tire. Thus by employing the flanges the heads of the studs may be of greater diameter than their inner portions and the maximum tread surface produced without locating the cavities so closely together as to weaken the tire.

Figure 10:
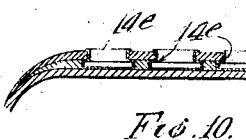

Fig. 10 shows a tread portion consisting of three layers, which may be of leather, comprising an outer layer 11, an intermediate layer 12 and an inner layer 13. In constructing this form the outer layer 11 is punched with holes to receive the upper portion of the studs or linings thereof, while the intermediate strip 12 is punched with holes of a larger diameter to receive the lower portions of the studs or linings, and the inner strip 13 is imperforate. By then cementing, or otherwise securing the three layers permanently together, cup shaped pockets are formed having enlarged lower portions to receive the linings 14ᵉ. In this form the plugs are removed, but their shape will be readily understood as the lower portion of the stud should be made to conform to the contour of the linings. This form of tread portion may be secured to the body of the tire in any desired manner.

Figure 1:
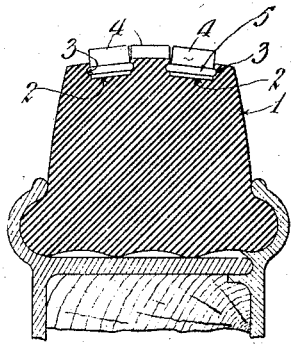
Figure 2:
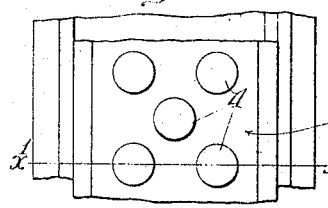
Figure 3:
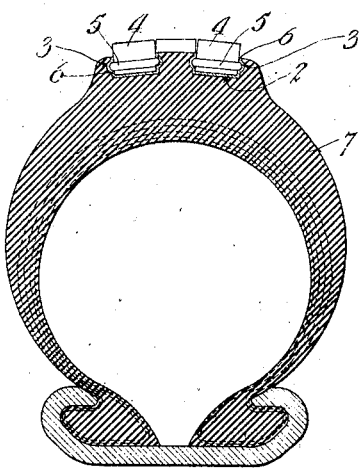
Figure 13:
Figure 11:
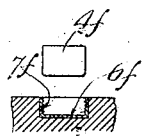

Fig. 11 shows another form in which the linings 6ᶠ are provided with internal screw threads 7ᶠ, and the plug 4ᶠ may be screwed thereinto.

Figure 12:
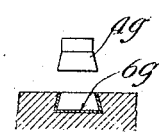
Figure 7:
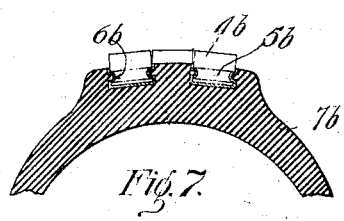
Fig. 7 shows still another form in which the studs 4ᵇ are provided with annular grooves 5ᵇ, which grooves are engaged by annular ribs 6ᵇ formed in the linings, the pockets in the tire 7ᵇ conforming to the contour of the linings, and the linings being vulcanized or otherwise permanently secured to the tire.

Fig. 12 shows a form in which the linings 6ᵍ are frusto-conical as shown, their smaller diameter being at the top, and the lower portion of the plug 4ᵍ is made frusto-conical to conform to the shape of the lining 6ᵍ, while the upper portion of the plug 4ᵍ may be cylindrical as shown.

Fig. 14 shows another modification in which the projection comprises a bar 20 which extends transversely of the tread, the bar having on its lower face a series of legs 21 which are detachably retained in linings 22 embedded in the tire 23. The projections 20 are spaced apart to form spaces 24 between them, as clearly shown in Fig. 14, and the upper face of each projection 20 is flat, as indicated in Fig. 15. The linings 22 may be dispensed with if desired, although it is preferred to employ them. In this form, the projection being of greater size has greater strength and the tire presents a flatter tread, inasmuch as each projection covers much greater area than the small projections heretofore mentioned. Each projection may readily be detached, when desired, as the legs 21 are detachably retained in the linings 22.

Fig. 16 shows a further modification in which the bars 20ª are arranged close together, there being no spaces between them, and the upper face of each bar 20ª is provided with a plurality of studs or projections 25, formed preferably integrally with the bar 20ª. The bar 20ª has legs 21ª, as shown in Fig. 17, which are detachably seated in linings 22ª. In this form a large number of studs 25 are provided without weakening the tire to such an extent as if they were directly embedded in the tread, and as the bar 21ª carries a large number of studs 25, the renewal of studs 25 is accomplished much quicker as a large number of them are removed or applied whenever a single bar 21ª is removed or attached.

It is an essential feature of the present invention that the studs are inserted into the tire from the outside and are so held that they can be removed outwardly so that any stud can be removed from the tire without disturbing the body of the tire. To enable such removal it is necessary that the lateral grip between the stud and the recess should be releasable by merely pulling on the stud. In the form shown in Fig. 6 this releasability follows from the frictional nature of the grip in connection with the elastic nature of the stud and in those forms above described wherein the stud and the recess are made of variant diameter along the longitudinal axis the releasability is secured by forming the stud of elastic material so as to enable it to be laterally compressible and by restricting the variation in diameter so that the necessary lateral compression for release can be effected without disruption of the stud. The recesses being closed at the bottom and the material of the stud being elastically plastic under pressure it follows that the effect of pressure on the stud is to press the frictionally engaging parts of the stud and recess into tighter engagement so that the stronger the pressure the stronger will be the grip. In any case the engagement between the stud and the recess may be considered as a frictional engagement even when the friction is increased by making the parts of variant diameter to remove frictional engagement being herein used in distinction from a positive interlock such as would prevent withdrawal or outward detachment of the stud.

What I claim is:—

1. A tire having a plurality of recesses, a cup like receptacle permanently secured in each recess, having variant internal diameters, and a stud of yielding material removably seated in each recess and projecting therefrom, the portion of each stud within the receptacle corresponding in its external diameter with the internal diameter of the receptacle.

2. In a rubber tire, a metal cup vulcanized into its tread portion, said cup having an annular exterior recess at its top and a rubber stud conforming in shape with the interior of said cup and detachably seated therein.

3. As a new article of manufacture, a rubber stud for the tread of tires, said stud having an annular recess and an annular flange immediately below the recess, said flange being a continuation of the bottom of the stud.

4. As a new article of manufacture, a metal cup-like receptacle for vulcanizing into the tread of a rubber tire, said receptacle having an annular exterior recess at its top and having an annular interior recess immediately below said exterior recess and approximately in line with the bottom of said cup.

5. As a new article of manufacture, a rubber vehicle tire having a series of metal cups having shouldered sides vulcanized in its outer face, a detachable rubber stud in each cup engaging said shouldered sides, the top of said stud projecting beyond the top of said cup and the lower portion of said stud being shaped to register with the inner portion of said cup, and said cup having a metal bottom.

6. A renewable wearing portion for tires comprising a series of metal cups and detachable rubber studs in the cups, said cups being vulcanized into the outer portion of the tire, said cups having inner shouldered sides, said studs being shaped to register and engage within said cups and projecting therefrom.

7. In a vehicle tire, means for holding a detachable tread portion thereto comprising metal cups having inner shouldered sides, said cups being vulcanized into the outer portion of the tire, said tread portion consisting of individual rubber studs and said studs having their lower portions shaped to register with and engage within said cups and projecting therefrom.

8. In a vehicle tire, means for holding a detachable tread portion thereto comprising metal cups having inner shouldered sides, said cups being vulcanized into the outer portion of the tire, said tread portion consisting of individual rubber studs and said studs having their lower portions shaped to register with and engage within said cups and projecting therefrom, said cups having metal bottoms, and each of said studs being removable outwardly and independently of the others.

9. In a rubber vehicle tire, a series of metal cups vulcanized into its outer portion, said cups having inner shouldered sides, a series of detachable rubber studs shaped to conform to the inner portion of said cups, said cups having metal bottoms and flanged tops and said studs being seated in said cups and projecting beyond the outer surface of the tire and forming a tread thereon.

10. A rubber tire having a separable projecting tread consisting of a series of independently detachable rubber studs, said studs being secured to the outer surface of the tire by means comprising metal cups vulcanized into the tire and having inner shouldered sides, said studs shaped to register within said cups and seated therein and projecting therefrom, and said studs being singly removable from without.

11. A rubber tire having a separable projecting tread consisting of a series of independently detachable rubber studs, said studs being secured to the outer surface of the tire by means comprising metal cups having metal bottoms and flanged tops vulcanized into the tire and having inner shouldered sides, said studs shaped to register within said cups and seated therein and projecting therefrom, and said studs being singly removable from without.

In testimony whereof, I have hereunto set my hand at Los Angeles, California, this 29th day of January, 1908.

JUNIUS A. BOWDEN.

In presence of—
 GEORGE T. HACKLEY,
 FRANK L. A. GRAHAM.